United States Patent
Tsubaki

(10) Patent No.: US 10,354,806 B2
(45) Date of Patent: Jul. 16, 2019

(54) ELECTROLYTIC CAPACITOR AND METHOD FOR MANUFACTURING SAME

(71) Applicant: Panasonic Intellectual Property Management Co., Ltd., Osaka (JP)

(72) Inventor: Yuichiro Tsubaki, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/597,178

(22) Filed: May 17, 2017

(65) Prior Publication Data

US 2017/0256362 A1    Sep. 7, 2017

Related U.S. Application Data

(63) Continuation of application No. PCT/JP2015/005602, filed on Nov. 10, 2015.

(30) Foreign Application Priority Data

Dec. 1, 2014    (JP) .................. 2014-243414

(51) Int. Cl.
*H01G 9/00* (2006.01)
*H01G 9/15* (2006.01)
*H01G 9/028* (2006.01)

(52) U.S. Cl.
CPC .......... *H01G 9/0036* (2013.01); *H01G 9/028* (2013.01); *H01G 9/151* (2013.01); *H01G 9/15* (2013.01); *H01G 2009/0014* (2013.01)

(58) Field of Classification Search
CPC ........ H01G 9/0036; H01G 9/15; H01G 9/151; H01G 2009/0014; H01G 2009/0018; H01G 9/025; H01G 9/028; H01G 11/56; H01G 11/84; H01G 11/86
See application file for complete search history.

(56) References Cited

U.S. PATENT DOCUMENTS

| | | |
|---|---|---|
| 2003/0147202 A1 | 8/2003 | Kudoh et al. |
| 2004/0184221 A1 | 9/2004 | Kudoh et al. |

(Continued)

FOREIGN PATENT DOCUMENTS

| | | |
|---|---|---|
| CN | 101488398 A | 7/2009 |
| JP | 2000-138133 | 5/2000 |
| JP | 2001-155964 | 6/2001 |

(Continued)

OTHER PUBLICATIONS

English Translation of Chinese Search Report dated Aug. 9, 2018 for the related Chinese Patent Application No. 201580064261.2.

(Continued)

*Primary Examiner* — Scott B Geyer
(74) *Attorney, Agent, or Firm* — McDermott Will & Emery LLP

(57) ABSTRACT

An electrolytic capacitor includes an anode body having a dielectric layer, and a solid electrolyte layer including a conductive polymer. The solid electrolyte layer includes the conductive polymer, an anion, and a cation. The anion is an anion corresponding to at least one acid selected from the group consisting of a phosphorus-containing oxoacid, sulfuric acid, and a carboxylic acid. The cation is a nitrogen-containing cation.

20 Claims, 4 Drawing Sheets

(56) References Cited

U.S. PATENT DOCUMENTS

2010/0182734 A1* 7/2010 Ning .................. H01G 9/0036
361/524
2012/0300368 A1 11/2012 Matsuura et al.

FOREIGN PATENT DOCUMENTS

| JP | 2010-157555 | 7/2010 |
|----|-------------|--------|
| JP | 2011-225690 | 11/2011 |
| WO | 2011/099261 | 8/2011 |

OTHER PUBLICATIONS

International Search Report of PCT application No. PCT/JP2015/005602 dated Jan. 26, 2016.

* cited by examiner

ELECTROLYTIC CAPACITOR AND METHOD FOR MANUFACTURING SAME

RELATED APPLICATIONS

This application is a Continuation of International Application No. PCT/JP2015/005602, filed on Nov. 10, 2015, which in turn claims priority from Japanese Patent Application No. 2014-243414, filed on Dec. 1, 2014, the contents of all of which are incorporated herein by reference in their entireties.

BACKGROUND

1. Technical Field

The present disclosure relates to an electrolytic capacitor including a conductive polymer layer (solid electrolyte layer), and a method for manufacturing the electrolytic capacitor.

2. Description of the Related Art

Along with digitalization of electronic devices, small-sized and large capacitance capacitors, which are used in the electronic devices, having low equivalent series resistance (ESR) in a high frequency range have been demanded.

Promising candidates as small-sized, large capacitance, and low ESR capacitors are electrolytic capacitors including as a cathode material a conductive polymer such as polypyrrole, polythiophene, polyfuran, or polyaniline. For example, an electrolytic capacitor including a dielectric layer-formed anode foil (anode body), and a conductive polymer layer (solid electrolyte layer) as a cathode material, which is provided on the anode foil, is proposed.

In Unexamined Japanese Patent Publication No. 2011-225690, from the viewpoint of reducing the ESR, it is proposed that a suspension containing a conductive polymer and a cationic surfactant is used for forming a solid electrolyte layer and improving permeability into an anode body.

In Unexamined Japanese Patent Publication No. 2001-155964, from the viewpoint of increasing a withstand voltage, it is proposed that phosphoric acid or a phosphate is added to a solution or a dispersion that contains a conductive polymer.

SUMMARY

An electrolytic capacitor according to a first aspect of the present disclosure includes an anode body having a dielectric layer, and a solid electrolyte layer including a conductive polymer. The solid electrolyte layer includes the conductive polymer, an anion, and a cation. The anion is an anion corresponding to at least one acid selected from the group consisting of a phosphorus-containing oxoacid, sulfuric acid, and a carboxylic acid. The cation is a nitrogen-containing cation.

A method for manufacturing an electrolytic capacitor according to a second aspect of the present disclosure includes impregnating an anode body having a dielectric layer with a dispersion containing a conductive polymer, a solvent, an anion, and a cation. The anion is an anion corresponding to at least one acid selected from the group consisting of a phosphorus-containing oxoacid, sulfuric acid, and a carboxylic acid. The cation is a nitrogen-containing cation.

A method for manufacturing an electrolytic capacitor according to a third aspect of the present disclosure includes: impregnating an anode body having a dielectric layer with a dispersion containing a conductive polymer and a solvent; and impregnating the anode body impregnated by the dispersion with a treatment solution containing an anion and a cation. The anion is an anion corresponding to at least one acid selected from the group consisting of a phosphorus-containing oxoacid, sulfuric acid, and a carboxylic acid. The cation is a nitrogen-containing cation.

According to the aspects of the present disclosure described above, there can be provided an electrolytic capacitor which is high in a film formation property of a conductive polymer and whose ESR is reduced.

DETAILED DESCRIPTION OF EMBODIMENT

Prior to description of an exemplary embodiment of the present disclosure, problems of a conventional electrolytic capacitor are described.

A surfactant and a phosphate are, when added to a dispersion containing a conductive polymer, adsorbed to an anode body to cause a tendency for a hydrophobic group to be locally present on the anode body at a solid electrolyte layer side. Thus, there is a limit for improvement of permeability of the dispersion into the anode body. On the other hand, when phosphoric acid is added to a dispersion, a conductive polymer is likely to aggregate. Thus, permeability of the dispersion into an anode body is deteriorated. As a result, a film formation property of a conductive polymer is deteriorated, so that ESR cannot be reduced.

Hereinafter, the exemplary embodiment of an electrolytic capacitor and methods for manufacturing the electrolytic capacitor according to the present disclosure is described with reference to drawings. The exemplary embodiment below, however, is not for limiting the present disclosure.

<<Electrolytic Capacitor>>

Figure 1:
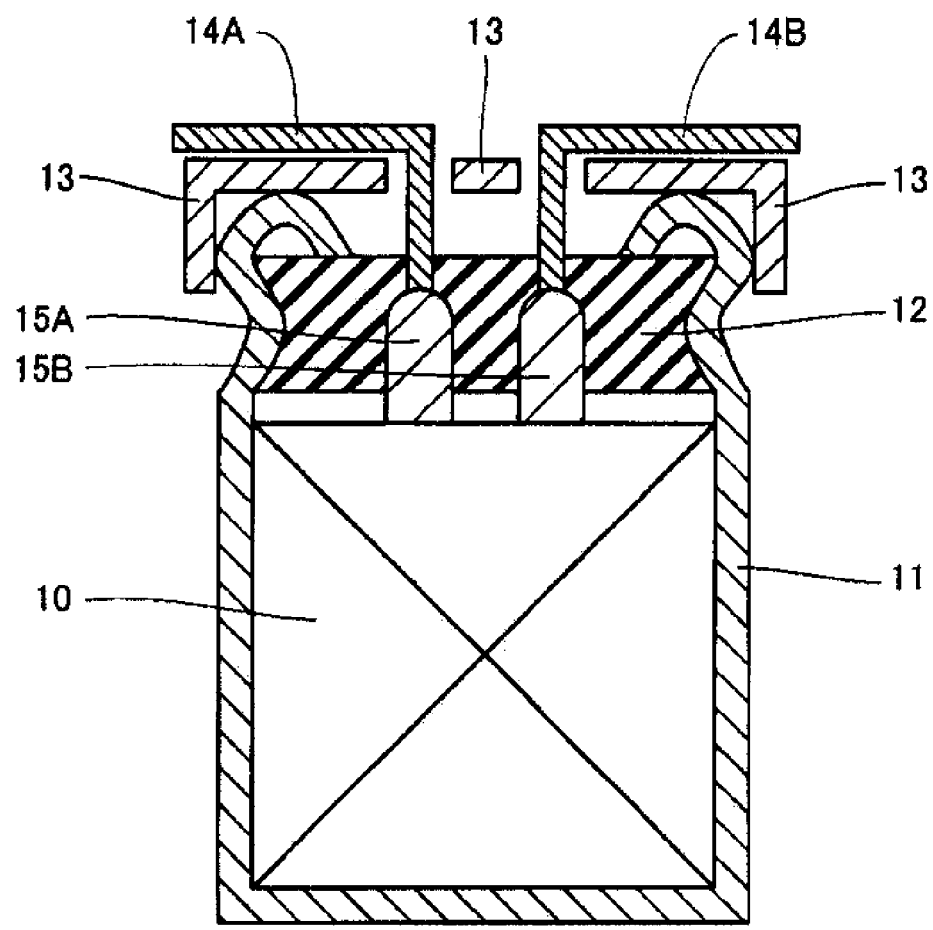
FIG. 1 is a schematic sectional view illustrating an electrolytic capacitor according to an exemplary embodiment of the present disclosure.
Figure 2:
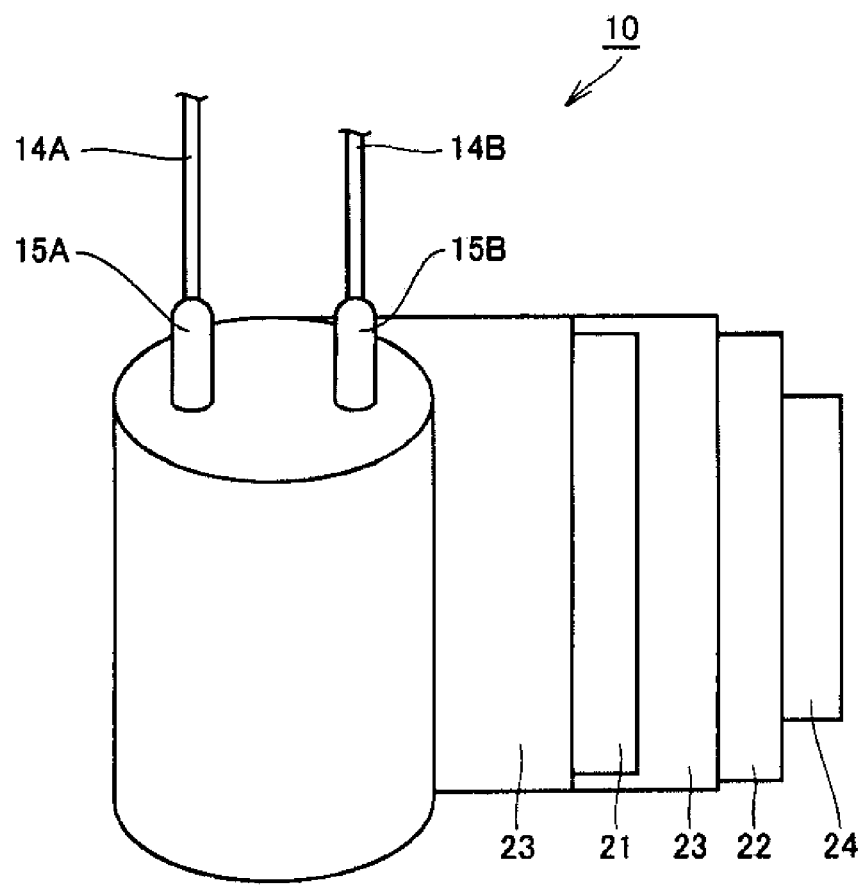
FIG. 2 is a schematic view illustrating a configuration of a capacitor element of the electrolytic capacitor in FIG. 1.

FIG. 1 is a schematic sectional view illustrating an electrolytic capacitor obtained by a manufacturing method according to an exemplary embodiment of the present disclosure. FIG. 2 is a schematic view illustrating a partially developed capacitor element included in the same electrolytic capacitor.

In FIG. 1, the electrolytic capacitor includes capacitor element 10 having anode body 21 on which a dielectric layer is formed; and a conductive polymer (not shown) covering at least a part of a surface (or attached to at least a part of a surface) of the dielectric layer. Capacitor element 10 is housed in an outer case in a state in which at least a part of the surface of the dielectric layer is covered with the conductive polymer. The outer case includes bottomed case 11 in which capacitor element 10 is housed, insulating sealing member 12 that seals an opening of bottomed case 11, and base plate 13 that covers sealing member 12. Bottomed case 11 is, at a part near an opening end, processed inward by drawing, and is, at the opening end, curled so as to swage sealing member 12.

For example, capacitor element 10 as shown in FIG. 2 is referred to a wound body. Capacitor element 10 includes anode body 21 connected to lead tab 15A, cathode body 22 connected to lead tab 15b, and separator 23. Anode body 21 and cathode body 22 are wound with separator 23 interposed between the anode body and the cathode body. An outermost periphery of capacitor element 10 is fixed with fastening tape 24. FIG. 2 shows partially developed capacitor element 10 before the outermost periphery of the capacitor element is fixed.

Anode body 21 includes a metal foil whose surface is roughened so as to include projections and recesses, and a dielectric layer is formed on the metal foil, which has the projections and recesses.

In the electrolytic capacitor, the conductive polymer is attached so as to cover at least a part of the surface of the dielectric layer formed on anode body 21. The attachment, however, is not limited to this case, and the conductive polymer may be attached to any position between anode body 21 and cathode body 22. For example, the conductive polymer covers at least a part of the surface of the dielectric layer formed on anode body 21, and may further cover at least a part of a surface of cathode body 22 and/or at least a part of a surface of separator 23. In the electrolytic capacitor, the conductive polymer (specifically, a film including the conductive polymer) that covers at least a part of the surface of, for example, the anode body, the cathode body, and the separator is generally referred to as a solid electrolyte layer (or a conductive polymer layer) in some cases.

The electrolytic capacitor may further include an electrolyte solution. In this case, the electrolyte solution is housed in the outer case (specifically, bottomed case 11) together with capacitor element 10 in which at least a part of the surface of the dielectric layer is covered with the conductive polymer.

Hereinafter, a configuration of the electrolytic capacitor according to the exemplary embodiment of the present disclosure is described in more detail.

A capacitor element includes an anode body on which a dielectric layer is formed. A conductive polymer attached to a surface of the dielectric layer substantially functions as a cathode material. The capacitor element may further include at least one of a cathode body and a separator as necessary.
(Capacitor Element)
(Anode Body)

Examples of the anode body include a metal foil whose surface is roughened. A type of a metal that constitutes the metal foil is not particularly limited, but it is preferable to use a valve metal such as aluminum, tantalum, or niobium, or an alloy including a valve metal, from the viewpoint of facilitating formation of the dielectric layer.

Roughening of a surface of the metal foil can be performed by a known method. By the roughening, a plurality of projections and recesses are formed on the surface of the metal foil. The roughening is preferably performed by etching the metal foil, for example. The etching may be performed by, for example, a direct current (DC) electrolytic method or an alternating current (AC) electrolytic method.
(Dielectric Layer)

The dielectric layer is formed on a surface of the anode body (specifically, a roughened surface of the metal foil).

A method for forming the dielectric layer is not particularly limited, and the dielectric layer can be formed by anodizing the metal foil. The anodizing may be performed by, for example, immersing the metal foil in an anodizing solution such as an ammonium adipate solution. In the anodizing, a voltage may be applied in a state in which the metal foil is immersed in the anodizing solution, as necessary.

Normally, a large metal foil formed of, for example, a valve metal is subjected to a roughening treatment and an anodizing from the viewpoint of mass productivity. In this case, the treated foil is cut into a desired size to prepare anode body 21.
(Cathode Body)

A metal foil may also be used for cathode body 22 as with the anode body. A type of the metal is not particularly limited, but it is preferable to use a valve metal such as aluminum, tantalum, or niobium, or an alloy including a valve metal. A surface of the metal foil may be roughened as necessary.

Further, an anodizing film may be provided on a surface of cathode body 22. A film of a metal different from the metal that constitutes the cathode body (different type of metal), or a nonmetal film may also be provided on a surface of cathode body 22. Examples of the different type of metal and the nonmetal include metals such as titanium and nonmetals such as carbon, respectively.
(Separator)

As separator 23, for example, a nonwoven fabric may be used. The nonwoven fabric includes a fiber of, for example, cellulose, polyethylene terephthalate, a vinylon, or a polyamide (e.g., an aliphatic polyamide and an aromatic polyamide such as aramid).

Capacitor element 10 can be produced by a known method. For example, capacitor element 10 may be produced by stacking anode body 21 and cathode body 22 with separator 23 interposed between the anode body and the cathode body. Anode body 21 and cathode body 22 may be wound with separator 23 interposed between the anode body and the cathode body to form a wound body as shown in FIG. 2. At this time, the winding may be conducted while lead tabs 15A, 15B are rolled in the anode body, the cathode body and the separator, to cause lead tabs 15A, 15B to stand up from the wound body as shown in FIG. 2.

A material for lead tabs 15A, 15B is not particularly limited as long as the material is a conductive material. Surfaces of lead tabs 15A, 15B may be subjected to an anodizing. Further, lead tabs 15A, 15B may be covered with a resin material at a part in contact with sealing member 12 and a part connected to lead wires 14A, 14B.

A material for lead wires 14A, 14B connected to lead tabs 15A, 15B, respectively, is not also particularly limited, and, for example, a conductive material may be used.

With fastening tape 24, an end of an outer surface of anode body 21, cathode body 22 or separator 23, which is positioned at an outermost layer of the wound body (cathode body 22 in FIG. 2), is fixed. When anode body 21 is prepared by cutting a large metal foil, the capacitor element in a state of, for example, a wound body, may further be subjected to an anodizing in order to provide a dielectric layer on a cutting surface of anode body 21.
(Solid Electrolyte Layer)

The solid electrolyte layer includes the conductive polymer, an anion, and a cation. Here, the anion is an anion corresponding to at least one acid selected from the group consisting of a phosphorus-containing oxoacid, sulfuric acid, and a carboxylic acid. And the cation is a nitrogen-containing cation.

In anode body 21, the solid electrolyte layer may be formed on at least a part of a surface of the dielectric layer so as to cover the dielectric layer. However, it is desirable to form the solid electrolyte layer so as to cover as large a region of the dielectric layer as possible. When the capacitor element includes at least one of the cathode body and the separator, the solid electrolyte layer may be formed on not only a surface of the dielectric layer but also a surface of at least one of the cathode body and the separator. That is, the solid electrolyte layer may be in contact with at least one of the separator and the cathode body.

According to the exemplary embodiment of the present disclosure, the anion and the cation as described above are used for formation of the solid electrolyte layer. Use of the anion and the cation suppresses aggregation of a conductive polymer and improves permeability of the conductive polymer into the dielectric layer so that the conductive polymer penetrates into as far as the dielectric layer formed along an inner wall surface of a pore or a dent (pit) on a surface of the anode body. Accordingly, the improved film formation property of a conductive polymer can enhance to increase electric conductivity of the solid electrolyte layer. As a result, ESR can be reduced. Further, the solid electrolyte layer that includes the above-mentioned anion and cation can also give, for some reasons, an effect of reducing resistance of the separator in contact with the solid electrolyte layer, and therefore, the ESR is considered to be also reduced by this effect.

(Conductive Polymer)

Examples of the conductive polymer include polypyrrole, polythiophene, polyfuran, polyaniline, polyacetylene, polyphenylene, polyphenylene vinylene, polyacene, and polythiophene vinylene. A single one or two or more in combination of these conductive polymers may be used, or a copolymer of two or more monomers may also be used.

In the present specification, polypyrrole, polythiophene, polyfuran, polyaniline, and the like mean polymers having, as a basic skeleton, polypyrrole, polythiophene, polyfuran, polyaniline, and the like, respectively. Therefore, polypyrrole, polythiophene, polyfuran, polyaniline, and the like may also include their derivatives. For example, polythiophene includes poly(3,4-ethylene dioxythiophene) and the like.

The conductive polymer may include a dopant. As the dopant, a polyanion can be used. Specific examples of the polyanion include polyvinylsulfonic acid, polystyrenesulfonic acid, polyallylsulfonic acid, polyacrylsulfonic acid, polymethacrylsulfonic acid, poly(2-acrylamido-2-methylpropanesulfonic acid), polyisoprenesulfonic acid, and polyacrylic acid. Especially, a polyanion derived from polystyrenesulfonic acid is preferable. A single one or two or more in combination of these polyanions may be used. These polyanions may be a polymer of a single monomer or a copolymer of two or more monomers.

A weight average molecular weight of the polyanion is not particularly limited, and ranges, for example, from 1,000 to 1,000,000, both inclusive. A conductive polymer including such a polyanion is easily and uniformly dispersed in a solvent, facilitating uniform attachment of the conductive polymer to a surface of the dielectric layer.

When the conductive polymer includes a dopant, adding only the cation sometimes causes abstraction of the dopant, deteriorating the electric conductivity. In the present exemplary embodiment, the abstraction of a dopant can be suppressed by adding the cation and the anion to the solid electrolyte layer.

(Anion)

Examples of the phosphorus-containing oxoacid corresponding to the anion include at least one selected from the group consisting of phosphoric acid (orthophosphoric acid $H_3PO_4$), phosphorous acid ($H_3PO_3$), phosphonic acid ($H_2PHO_3$), hypophosphorous acid ($H_2PHO_2$), and phosphinic acid ($HPH_2O_2$).

Examples of the carboxylic acid corresponding to the anion include monocarboxylic acids (e.g., $C_{1-6}$ aliphatic monocarboxylic acids) such as acetic acid, propionic acid, and butyric acid; polycarboxylic acids ($C_{2-6}$ aliphatic polycarboxylic acids) such as oxalic acid and malonic acid; and aliphatic hydroxy acids such as citric acid. From the viewpoint of suppressing adsorption to the dielectric layer, the carboxylic acid is preferably an aliphatic carboxylic acid (particularly, a $C_{1-4}$ aliphatic monocarboxylic acid and a $C_{2-4}$ aliphatic dicarboxylic acid) and/or an aliphatic hydroxy acid (a $C_{1-4}$ aliphatic hydroxy acid).

Among the acids described above, the phosphorus-containing oxoacid is preferable, and a phosphorus-containing oxoacid that includes phosphoric acid is more preferable.

The acid corresponding to the anion may be a partial ester as long as the partial ester has at least one salt-forming moiety capable of generating a free monovalent cationic group. The acid corresponding to the anion also includes such a partial ester.

In this regard, it is preferable in the acid that many of salt-forming moieties are free, and more preferable that all the salt-forming moieties are free. It is considered that when the solid electrolyte layer includes the anion corresponding to the acid that has many free salt-forming moieties as described above, the conductive polymer is likely to swell for some reasons so that the conductive polymer is likely to be sequenced. Accordingly, volume resistance of the solid electrolyte layer can be reduced so that an effect of lowering the ESR can be obtained. Further, when the acid includes many free salt-forming moieties (that is, when an ester group is not introduced), an adsorptive property of the anion to the dielectric layer is weakened, and thus deterioration of the film formation property of a conductive polymer is suppressed. From the same viewpoint described above, it is preferred that the acid (furthermore, the anion) does not have a hydrophobic group (e.g., a long-chain alkyl group and/or an aromatic hydrocarbon group).

In the solid electrolyte layer, a content of the anion is, for example, 0.1 parts by mass or more, preferably 1 part by mass or more, relative to 100 parts by mass of the conductive polymer in terms of a free acid. The content of the anion is preferably 100 parts by mass or less, further preferably 30 parts by mass or less or 10 parts by mass or less. Any of these minimum and maximum values can be combined. The content of the anion may range from 0.1 parts by mass to 100 parts by mass, both inclusive, from 0.1 parts by mass to 30 parts by mass, both inclusive, or from 1 part by mass to 10 parts by mass, both inclusive. The content of the anion in such a range further facilitates suppression of aggregation of the conductive polymer, and thus the permeability of the conductive polymer into the dielectric layer during formation of the solid electrolyte layer can be further improved. Accordingly, it is likely to obtain an effect of increasing the electric conductivity of the solid electrolyte layer, so that the ESR can be further reduced. Further, it is also possible to suppress increase in interface resistance between the dielectric layer and the conductive polymer. A content of the anion to be applied to the dielectric layer during formation of the solid electrolyte layer can also be in the same range as the content of the anion described above relative to 100 parts by mass of the conductive polymer.

(Cation)

The cation is a nitrogen-containing cation derived from a nitrogen-containing base. Examples of the nitrogen-containing base include at least one selected from the group consisting of ammonia and an amine.

Examples of the amine corresponding to the nitrogen-containing cation include an aliphatic amine, an alicyclic amine (e.g., cyclohexyl amine and isophoronediamine), an aromatic amine (e.g., aniline and diaminobenzene), and a cyclic amine. The amine may be any of a primary amine, a secondary amine, and a tertiary amine. The amine is not limited to a monoamine but may be a polyamine such as a diamine.

From the viewpoint of suppressing adsorption to the dielectric layer, the amine is preferably an aliphatic amine and a cyclic amine. Examples of the aliphatic amine include an alkylamine (e.g., mono($C_{1-6}$ alkyl)amines such as methylamine and ethylamine; di($C_{1-6}$ alkyl)amines such as diethylamine; and tri($C_{1-6}$ alkyl)amines such as triethylamine) and a diaminoalkane (e.g., ethylenediamine). Examples of the cyclic amine include 5-membered cyclic amine to 8-membered cyclic amine such as imidazole, imidazoline, piperidine, piperazine, morpholine, and pyridine.

These amines may have a substituent such as a hydroxyl group and/or alkoxy group (e.g., $C_{1-6}$ alkoxy groups such as methoxy and ethoxy, or $C_{1-4}$ alkoxy groups). Further, the cyclic amine may have a substituent such as an alkyl group (e.g., $C_{1-4}$ alkyl groups such as methyl and ethyl), an alkoxy group (e.g., $C_{1-4}$ alkoxy groups such as methoxy and ethoxy), and/or an amino group.

The cation and the anion are not particularly limited as to a form of being contained in the solid electrolyte layer, and may be contained in the solid electrolyte layer as a free base and a free acid, respectively, or may be contained in a state in which the cation and the anion form a salt. The cation (preferably a part of cations) may be contained in a state of forming a salt with a dopant included in the conductive polymer. In cases where the cation forms a salt in the solid electrolyte layer, the cation may be contained in the solid electrolyte layer in a form of an amine salt and/or an ammonium salt.

From the viewpoint of low cost, provision of high capacitance, and a higher effect of reducing the ESR, the solid electrolyte layer preferably includes, among the cations, a cation derived from ammonia (ammonium cation). Especially, a phosphoric acid anion and an ammonium cation preferably form a salt in the solid electrolyte layer. Examples of such a salt include at least one selected from the group consisting of ammonium phosphate, diammonium hydrogen phosphate, and ammonium dihydrogen phosphate.

The solid electrolyte layer preferably includes the cation and the anion in a ratio of, for example, 1 equivalent or more, preferably 1 equivalent or more and 5 equivalent or less, further preferably 2 equivalent or more and 4 equivalent or less, or 2.5 equivalent or more and 3.5 equivalent or less of the anion, to 1 equivalent of the cation. With the equivalent ratio of the anion to the cation in such a range, it is further likely to suppress aggregation of the conductive polymer, so that the conductive polymer more smoothly penetrates into the dielectric layer.

(Electrolyte Solution)

The electrolytic capacitor does not necessarily need to include the electrolyte solution, however, can further improve a restoration function of the dielectric layer when including the electrolyte solution.

As the electrolyte solution, a nonaqueous solvent may be used, or a solution that contains a nonaqueous solvent and an ionic substance (solute) dissolved in the nonaqueous solvent may also be used. The nonaqueous solvent is a collective term for liquids except water and except liquids containing water, and includes an organic solvent and an ionic liquid.

The nonaqueous solvent is preferably a high boiling point solvent (for example, a solvent having a boiling point higher than a boiling point of water). For example, there may be used a polyhydric alcohol (e.g., alkylene glycols such as ethylene glycol and propylene glycol; polyalkylene glycols such as polyethylene glycol; and glycerins such as glycerin and polyglycerin), cyclic sulfones such as sulfolane, lactones such as γ-butyrolactone (γBL), amides such as N-methylacetamide, N,N-dimethylformamide, and N-methyl-2-pyrrolidone, esters such as methyl acetate, ethers such as 1,4-dioxane, ketones such as methyl ethyl ketone, and formaldehyde. A single one or two or more in combination of the nonaqueous solvents may be used.

As the solute, a salt of an anion and a cation is used, and an organic salt is preferable in which at least one of the anion and the cation is an organic substance. Examples of the organic salt include trimethylamine maleate, triethylamine borodisalicylate, ethyldimethylamine phthalate, mono 1,2,3,4-tetramethylimidazolinium phthalate, and mono 1,3-dimethyl-2-ethylimidazolinium phthalate. A single one or two or more in combination of the solutes may be used.

<<Method for Manufacturing Electrolytic Capacitor>>

Figure 3:
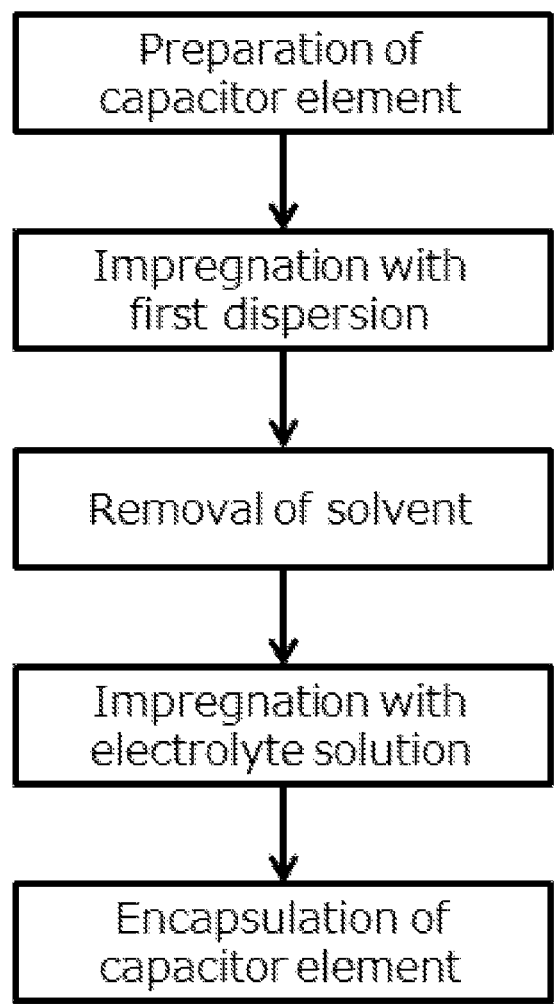
FIG. 3 is a flow chart illustrating steps of manufacturing an electrolytic capacitor according to a first method of the present exemplary embodiment.
Figure 4:
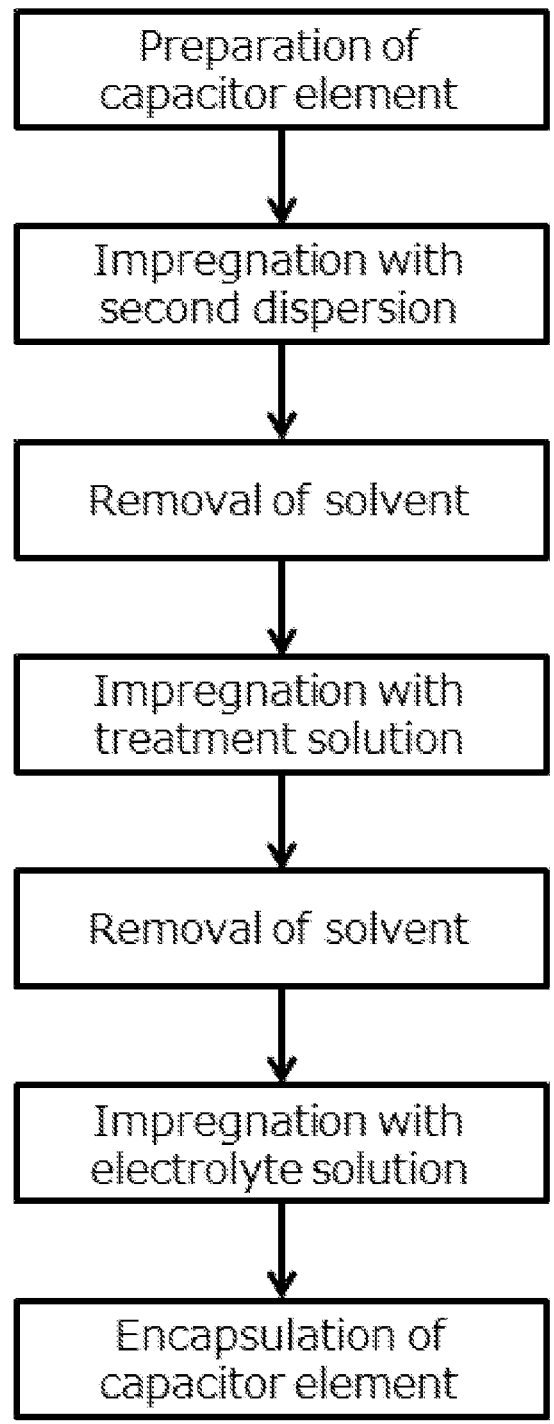
FIG. 4 is a flow chart illustrating steps of manufacturing an electrolytic capacitor according to a second method of the present exemplary embodiment.

Hereinafter, an example of a method for manufacturing an electrolytic capacitor according to the exemplary embodiment of the present disclosure is described according to each of steps. FIG. 3 is a flow chart illustrating steps of manufacturing an electrolytic capacitor according to a first method of the present exemplary embodiment, and FIG. 4 is a flowchart illustrating steps of manufacturing an electrolytic capacitor according to a second method of the present exemplary embodiment.

An electrolytic capacitor can be manufactured by the first method that includes a step (first step) of impregnating an anode body having a dielectric layer (or capacitor element 10) with a dispersion (first dispersion) containing a conductive polymer, a solvent (first solvent), an anion, and a cation. Alternatively, an electrolytic capacitor may be manufactured by the second method that includes a step (second step) of impregnating an anode body having a dielectric layer (or capacitor element 10) with a dispersion (second dispersion) containing a conductive polymer and a solvent, and a step (third step) of impregnating the anode body (or capacitor element 10) impregnated by the dispersion with a treatment solution containing an anion and a cation.

Through the first step, or a set of the second step and the third step, a solid electrolyte layer that includes the conductive polymer and the above-mentioned anion and cation can be formed. A solvent component may be removed in an appropriate timing such as after the first step, between the second step and the third step, or after the third step. As described above, the solid electrolyte layer is not formed by electropolymerization or chemical polymerization, but is formed with use of the dispersion containing at least the conductive polymer and the solvent, in the present exemplary embodiment.

(i) First Method (i-1) Step of Impregnating Capacitor Element (Wound Body) 10 with First Dispersion (First Step)

Impregnation of capacitor element 10 with the first dispersion is not particularly limited as long as the first dispersion can be applied to at least the anode body (particularly, at least the dielectric layer). For example, the capacitor element may be immersed in the first dispersion, or the first dispersion may be injected into the capacitor element. The impregnation may be conducted under atmospheric pressure, but may also be conducted in an atmosphere under a reduced pressure ranging, for example, from 10 kPa to 100 kPa, both inclusive, preferably from 40 kPa to 100 kPa, both inclusive. The impregnation may also be conducted under ultrasonic vibration as necessary. An impregnation period depends on a size of capacitor element 10, but ranges, for example, from 1 second to 5 hours, both inclusive, preferably from 1 minute to 30 minutes, both inclusive. By this step, the first dispersion is applied to capacitor element 10.

In the first dispersion, the conductive polymer is, in a state of particles, dispersed in the solvent (first solvent). The dispersion can be obtained by, for example, polymerizing, in the first solvent, a raw material of the conductive polymer (e.g., a precursor such as a monomer and/or an oligomer of the conductive polymer) in the presence of a dopant to generate particles of the conductive polymer including the dopant, and adding the anion and the cation to the first solvent.

With both the anion and the cation present in the first dispersion, surface tension is lowered to improve wettability for the dielectric layer, unlike cases where only the anion or the cation is present in the first dispersion. Further, aggregation of the conductive polymer may be suppressed to prolong a pot life of the dispersion. From the viewpoint of suppressing aggregation of the conductive polymer, the anion and the cation are preferably added as simultaneously as possible, and thus, a mixture of the anion and the cation may be added or a salt of the anion and the cation may be added. At least either one of the anion and the cation is preferably added in a form of a solution obtained by dissolving the anion or the cation in the solvent constituting the dispersion. The anion and the cation may be present in the first dispersion by addition of an acid and a base that correspond to the anion and the cation, respectively (or a salt of the anion and the cation).

The first solvent is not particularly limited, and may be water or a nonaqueous solvent (e.g., an organic solvent and an ionic liquid). As the first solvent, a polar solvent is preferable. The polar solvent may be a protic solvent or an aprotic solvent.

Examples of the protic solvent include a monohydric alcohol (e.g., methanol, ethanol, propanol, and butanol); a polyhydric alcohol (e.g., alkylene glycols such as ethylene glycol and propylene glycol, polyalkylene glycols such as polyethylene glycol, and glycerins such as glycerin and polyglycerin); glycol monoethers such as diethylene glycol monobutyl ether; formaldehyde; and water.

Examples of the aprotic solvent include amides such as N-methylacetamide, N,N-dimethylformamide, and N-methyl-2-pyrrolidone; esters such as methyl acetate; ketones such as methyl ethyl ketone and γ-butyrolactone; ethers (cyclic ethers) such as 1,4-dioxane; sulfones such as dimethyl sulfoxide and sulfolane; and carbonate compounds (e.g., cyclic carbonates) such as propylene carbonate.

Especially, the first solvent is preferably a protic solvent. Particularly, the first solvent preferably contains water. In this case, handleability of the first dispersion and dispersibility of the conductive polymer are improved. When the first solvent contains a polyhydric alcohol, the conductive polymer swells so that the conductive polymer is likely to be sequenced. And thus the electric conductivity of the solid electrolyte layer can be further increased (that is, the ESR can be further lowered). Accordingly, it is preferable that the first solvent also contains a polyhydric alcohol, and it is also preferable that the first solvent contains at least water and a polyhydric alcohol.

Particles of the conductive polymer dispersed in the dispersion preferably have a median diameter ranging from 0.01 μm to 0.5 μm, both inclusive in a volume particle size distribution obtained by measurement with a particle diameter measuring apparatus according to dynamic light scattering (hereinafter, simply referred to as a median diameter according to dynamic light scattering). A particle diameter of the conductive polymer can be adjusted by, for example, polymerization conditions and dispersion conditions.

Concentration of the conductive polymer (including a dopant or a polyanion) in the first dispersion preferably ranges from 0.5% by mass to 10% by mass, both inclusive. The first dispersion having such a concentration is suitable for attachment of an appropriate amount of the conductive polymer and is easily impregnated into capacitor element 10, and thus it is advantages for improving productivity.

(i-2) Step of Removing at Least Part of Solvent (First Drying Step)

The solid electrolyte layer may be formed through the first step and a first drying step.

In the first drying step, the solvent (first solvent) can be removed from the capacitor element (or the anode body) that has been impregnated with the first dispersion. At least a part of the solvent may be removed, or the solvent may be removed completely.

The solvent may be removed by vaporization under heating or may be removed under reduced pressure as necessary.

(ii) Second Method (ii-1) Step of Impregnating Capacitor Element (Wound Body) 10 with Second Dispersion (Second Step)

The second dispersion contains a conductive polymer and a solvent (second solvent). The second dispersion can be obtained by polymerizing, in the second solvent, a raw material of the conductive polymer (e.g., a precursor such as a monomer and/or an oligomer of the conductive polymer) in the presence of a dopant to generate particles of the conductive polymer including the dopant.

The second solvent can be appropriately selected from the first solvents exemplified for the first dispersion. A median diameter of the conductive polymer dispersed in the dispersion and concentration of the conductive polymer in the dispersion can be selected from the ranges described for the first dispersion. Also for a procedure and conditions of impregnating capacitor element 10 with the second dispersion, the description for the first dispersion can be referred to.

After impregnation of capacitor element 10 with the second dispersion, the capacitor element may be directly subjected to the third step, or at least a part of the solvent may be removed (the second drying step) and then the capacitor element may be subjected to the third step.

(ii-2) Second Drying Step

In the second drying step, removal of the second solvent can be performed by the same procedure as in the first drying step described above. The solid electrolyte layer may be formed by the removal of the second solvent. From the viewpoint of increasing the permeability of the conductive polymer into the dielectric layer, capacitor element 10 is preferably subjected to the third step before formation of the solid electrolyte layer (for example, without completely removing the second solvent).

(ii-3) Step of Impregnating Capacitor Element 10 with Treatment Solution Containing Anion and Cation (Third Step)

In the third step, capacitor element 10 that has been impregnated with the second dispersion (or capacitor element 10 obtained by removing at least a part of the solvent after impregnation with the second dispersion) is impregnated with a treatment solution. When the solid electrolyte layer is formed by the second drying step, the solid electrolyte layer is impregnated with the treatment solution in the third step.

The treatment solution can contain a solvent (third solvent) in addition to the anion and the cation. The third solvent may be, for example, a non-polar solvent (e.g., a hydrocarbon, ethyl acetate, and diethyl ether), but is preferably a polar solvent. Examples of the polar solvent include the protic and aprotic solvents exemplified for the first solvent. The treatment solution may contain, as the third solvent, one solvent or at least two solvents in combination. As the third solvent, the treatment solution preferably contains a polyhydric alcohol or may contain a polyhydric alcohol and a solvent (e.g., a protic solvent) other than a polyhydric alcohol. When the treatment solution contains a polyhydric alcohol, the conductive polymer swells so that the conductive polymer is likely to be sequenced. And thus it is further advantageous to reduce the ESR.

The treatment solution can be prepared by adding the anion and the cation to the third solvent. As the anion and the cation, an acid and a base corresponding to the anion and the cation, respectively (or a salt of the anion and the cation) may be used.

Concentrations of the anion and the cation in the treatment solution can be appropriately determined in such a manner that an amount of the anion relative to 100 parts by mass of the conductive polymer is in the ranges described above and an equivalent ratio of the anion to 1 equivalent of the cation is in the ranges described above.

(ii-4) Third Drying Step

After impregnation of capacitor element 10 with the treatment solution, it is preferable to remove at least a part of solvent components (the second solvent and the third solvent) included in capacitor element 10 (third drying step). Removal of the solvent components can be performed by the same procedure as in the first drying step described above. The solid electrolyte layer may be formed in this point by the removal of the solvent components.

In the first method, the first step and the first drying step (optional step) may be repeated two or more times as necessary. In the second method, at least one step selected from the group consisting of the second step, the second drying step (optional step), the third step, and the third drying step (optional step) may be repeated two or more times as necessary. Steps selected from these steps may be, as a series of steps, repeated two or more times.

(iii) Step of Impregnating Capacitor Element (Wound Body) 10 with Electrolyte Solution (Fourth Step)

After the first step (further the first drying step) or the third step (further the third drying step), capacitor element 10 (specifically, the anode body having the dielectric layer) can be further impregnated with an electrolyte solution. The fourth step is not necessarily needed, however, impregnation with the electrolyte solution can further improve the restoration function of the dielectric layer.

The impregnation of capacitor element 10 with the electrolyte solution is not particularly limited and can be conducted by a known method. For example, capacitor element 10 may be immersed in the electrolyte solution, or the electrolyte solution may be injected into a container housing capacitor element 10. The impregnation of the capacitor element with the electrolyte solution may be conducted under reduced pressure (e.g., 10 kPa to 100 kPa, both inclusive) as necessary.

(Others)

Capacitor element 10 may be encapsulated. More specifically, first, capacitor element 10 is housed in bottomed case 11 so that lead wires 14A, 14B are positioned on an open upper surface of bottomed case 11. As a material for bottomed case 11, there can be used metals such as aluminum, stainless steel, copper, iron and brass, or an alloy of these metals.

Next, sealing member 12 formed so as to allow lead wires 14A, 14B to penetrate the sealing member is disposed above capacitor element 10 to encapsulate capacitor element 10 in bottomed case 11. Sealing member 12 is sufficient as long as the sealing member is an insulating substance. As the insulating substance, an elastic body is preferable, and, for example, high heat resistance silicone rubber, fluororubber, ethylene propylene rubber, chlorosulfonated polyethylene rubber (e.g., Hypalon rubber), butyl rubber or isoprene rubber is especially preferable.

Next, bottomed case 11 is, at a part near an opening end, processed by transverse drawing, and is, at the opening end, curled so as to swage sealing member 12. Then, base plate 13 is disposed on a curled part of the bottomed case to complete the electrolytic capacitor as shown in FIG. 1. Subsequently, an aging treatment may be performed while a rated voltage is applied.

In the exemplary embodiment described above, a wound electrolytic capacitor has been described. The application range of the present disclosure, however, is not limited to the wound electrolytic capacitor and can be applied to other electrolytic capacitors such as a chip electrolytic capacitor including a metal sintered body as an anode body, and a laminated electrolytic capacitor including a metal plate as an anode body.

EXAMPLES

Hereinafter, the present disclosure is specifically described by way of examples and comparative examples. The present disclosure, however, is not limited to the examples below.

Example 1

A wound electrolytic capacitor (diameter: 10 mm, length: 10 mm) having a rated voltage of 25 V and a rated electrostatic capacity of 330 µF, as shown in FIG. 1, was produced in the following procedure, and evaluation for the electrolytic capacitor was conducted.

(1) Manufacturing of Electrolytic Capacitor
(Preparation of Anode Body Having Dielectric Layer)

A 100-µm-thick aluminum foil was subjected to etching to roughen a surface of the aluminum foil. Then, a dielectric layer was formed on the surface of the aluminum foil by an anodizing with an ammonium adipate aqueous solution to prepare an anode body having the dielectric layer.

(Preparation of Cathode Body)

A 50-µm-thick aluminum foil was subjected to etching to roughen a surface of the aluminum foil to prepare a cathode body.

(Production of Capacitor Element (Wound Body))

An anode lead tab and a cathode lead tab were connected to the anode body and the cathode body, respectively, and the anode body and the cathode body were wound with a separator interposed between the anode body and the cathode body while the lead tabs were rolled in the anode body, the cathode body and the separator, to give a capacitor element. Ends of the lead tabs protruding from the capacitor element were connected to an anode lead wire and a cathode lead wire, respectively. Then, the produced capacitor element was subjected to an anodizing again to form a dielectric layer at a cutting end of the anode body. Next, an end of an outer surface of the capacitor element was fixed with a fastening tape.

(Impregnation with First Dispersion)

A mixed solution was prepared by dissolving 3,4-ethylene dioxythiophene and dopant polystyrenesulfonic acid in ion-exchanged water (first solvent). Ferric sulfate and sodium persulfate (an oxidant) dissolved in ion-exchanged water were added to the resultant mixed solution while the mixed solution was stirred, to cause a polymerization reaction. After the reaction, the resultant reaction solution was dialyzed to remove unreacted monomers and an excessive oxidant, so that a dispersion liquid was obtained that contained about 5% by mass of poly 3,4-ethylene dioxythiophene (PEDOT) (a conductive polymer) doped with polystyrenesulfonic acid.

To the resultant dispersion liquid, ammonium dihydrogen phosphate and ethylene glycol were added and mixed to prepare a first dispersion. At this time, ammonium dihydrogen phosphate was mixed in an amount of 3 parts by mass (about 2.56 parts by mass in terms of free phosphoric acid) relative to 100 parts by mass of the conductive polymer.

Next, the capacitor element was impregnated with the resultant first dispersion for 5 minutes. The capacitor element was heated at 150° C. for 20 minutes to remove a solvent component. Thus, a solid electrolyte layer-formed capacitor element was produced.

(Impregnation with Electrolyte Solution)

Next, the capacitor element was impregnated with an electrolyte solution under reduced pressure. Used as the electrolyte solution was a solution containing γBL and mono(ethyldimethylamine) phthalate (solute) in a mass ratio of 75:25.

(Encapsulation of Capacitor Element)

The electrolyte solution-impregnated capacitor element was housed in an outer case as shown in FIG. 1 and encapsulated to produce an electrolytic capacitor. A total of 300 electrolytic capacitors were produced in the same manner.

(2) Evaluation of Performance (a) Electrostatic Capacity and ESR Value

Electrostatic capacity (μF) was measured as initial characteristics of the electrolytic capacitor. Specifically, initial electrostatic capacity (μF) at a frequency of 120 Hz was measured for the electrolytic capacitor with an LCR meter for 4-terminal measurement.

An ESR value (mΩ) was also measured as initial characteristics of the electrolytic capacitor. Specifically, the ESR value (mΩ) at a frequency of 100 kHz was measured for the electrolytic capacitor with an LCR meter for 4-terminal measurement.

The initial electrostatic capacity and the ESR value were measured for randomly selected 120 electrostatic capacitors, and average values for the initial electrostatic capacity and the ESR value were calculated, respectively.

Example 2

An electrolytic capacitor was produced in the same manner as in Example 1 except for using, as the first dispersion, a dispersion containing 10 parts by mass of ammonium dihydrogen phosphate relative to 100 parts by mass of the conductive polymer, and the evaluation of performance was conducted for the electrolytic capacitor.

Example 3

An electrolytic capacitor was produced in the same manner as in Example 1 except for using, as the first dispersion, a dispersion containing 30 parts by mass of ammonium dihydrogen phosphate relative to 100 parts by mass of the conductive polymer, and the evaluation of performance was conducted for the electrolytic capacitor.

Example 4

An electrolytic capacitor was produced in the same manner as in Example 1 except for using, in place of ethylene glycol, glycerin in preparation of the first dispersion, and the evaluation of performance was conducted for the electrolytic capacitor.

Example 5

(Impregnation with Second Dispersion)

Used as a second dispersion was a dispersion liquid that was obtained by the same procedure as in Example 1 and that contained about 5% by mass of PEDOT doped with polystyrenesulfonic acid. Next, a capacitor element produced in the same manner as in Example 1 was impregnated with the second dispersion for 5 minutes.

(Impregnation with Treatment Solution)

A treatment solution is prepared by adding an ammonium dihydrogen phosphate aqueous solution to ethylene glycol, which is a second solvent. The second dispersion-impregnated capacitor element was impregnated with the resultant treatment solution. The treatment solution was applied in such a manner that ammonium dihydrogen phosphate is in an amount of 10 parts by mass relative to 100 parts by mass of the conductive polymer applied to the capacitor element.

Next, the treatment solution-impregnated capacitor element was dried at 150° C. for 30 minutes to form a solid electrolyte layer on the capacitor element.

The solid electrolyte layer-formed capacitor element was impregnated with the electrolyte solution and encapsulated in the same manner as in Example 1 to produce an electrolytic capacitor. Then, the evaluation of performance was conducted in the same manner as in Example 1 for the electrolytic capacitor.

Example 6

Used as the first dispersion was a dispersion prepared in the same manner as in Example 1 except for adding, in place of the ammonium dihydrogen phosphate aqueous solution, phosphoric acid and ammonia to the dispersion liquid containing PEDOT (a conductive polymer) doped with polystyrenesulfonic acid. At this time, phosphoric acid and ammonia were used in such a ratio that an amount of phosphoric acid and ammonia is 10 parts by mass relative to 100 parts by mass of the conductive polymer applied to the capacitor element and that ammonia is in an amount of 1 mol relative to 1 mol of phosphoric acid.

An electrolytic capacitor was produced in the same manner as in Example 1 except for using the thus obtained first dispersion, and the evaluation of performance was conducted for the electrolytic capacitor.

Comparative Example 1

By the same procedure as in Example 1, a dispersion liquid (dispersion) was prepared that contained about 5% by mass of PEDOT doped with polystyrenesulfonic acid. Next, a capacitor element produced in the same manner as in Example 1 was impregnated with the dispersion for 5 minutes. The capacitor element was dried at 150° C. for 30 minutes to form a solid electrolyte layer on the capacitor element.

The solid electrolyte layer-formed capacitor element was impregnated with the electrolyte solution and encapsulated in the same manner as in Example 1 to produce an electrolytic capacitor. Then, the evaluation of performance was conducted in the same manner as in Example 1 for the electrolytic capacitor.

Comparative Example 2

Used as the first dispersion was a dispersion prepared in the same manner as in Example 1 except for adding, in place of the ammonium dihydrogen phosphate aqueous solution, phosphoric acid to the dispersion liquid containing PEDOT doped with polystyrenesulfonic acid. At this time, phosphoric acid was used in such a ratio as to have the same mole as the mole of ammonium dihydrogen phosphate in Example 2.

An electrolytic capacitor was produced in the same manner as in Example 1 except for using the thus obtained first dispersion, and the evaluation of performance was conducted for the electrolytic capacitor.

Comparative Example 3

Used as the first dispersion was a dispersion prepared in the same manner as in Example 1 except for adding, in place of the ammonium dihydrogen phosphate aqueous solution, aqueous ammonia to the dispersion liquid containing poly PEDOT doped with polystyrenesulfonic acid. At this time, ammonia was used in such a ratio as to have the same mole as the mole of ammonium dihydrogen phosphate in Example 2.

An electrolytic capacitor was produced in the same manner as in Example 1 except for using the thus obtained first dispersion, and the evaluation of performance was conducted for the electrolytic capacitor.

Table 1 shows results of the examples and the comparative examples.

TABLE 1

|  | Electrostatic capacity ($\mu$F) | ESR (m$\Omega$) |
| --- | --- | --- |
| Example 1 | 318 | 11.56 |
| Example 2 | 325 | 10.25 |
| Example 3 | 323 | 11.08 |
| Example 4 | 320 | 10.98 |
| Example 5 | 328 | 10.12 |
| Example 6 | 326 | 10.30 |
| Comparative Example 1 | 274 | 15.36 |
| Comparative Example 2 | 298 | 12.56 |
| Comparative Example 3 | 302 | 11.98 |

As shown in Table 1, the electrolytic capacitors in the examples were higher in electrostatic capacity and lower in an ESR value than the electrolytic capacitors in the comparative examples. These results are considered to be brought about because permeability of the conductive polymer into the dielectric layer was increased to improve electric conductivity of the solid electrolyte layer in the examples.

The present disclosure can be used for electrolytic capacitors including a conductive polymer as a cathode material.

What is claimed is:

1. A method for manufacturing an electrolytic capacitor, the method comprising:
   preparing a dispersion containing a conductive polymer, a solvent, an anion and a cation; and
   impregnating an anode body having a dielectric layer with the dispersion, wherein:
   the anion is an anion corresponding to at least one acid selected from the group consisting of a phosphorus-containing oxoacid, a sulfuric acid, and a carboxylic acid, and
   the cation is a nitrogen-containing cation.

2. The method for manufacturing an electrolytic capacitor according to claim 1, wherein the phosphorus-containing oxoacid includes a phosphoric acid.

3. The method for manufacturing an electrolytic capacitor according to claim 1, wherein the nitrogen-containing cation is a cation derived from at least one nitrogen-containing base selected from the group consisting of ammonia and an amine.

4. The method for manufacturing an electrolytic capacitor according to claim 1, wherein the anion and the cation form a salt.

5. The method for manufacturing an electrolytic capacitor according to claim 4, wherein the salt is at least one selected from the group consisting of ammonium phosphate, diammonium hydrogen phosphate, and ammonium dihydrogen phosphate.

6. The method for manufacturing an electrolytic capacitor according to claim 1, wherein an amount of the anion in terms of an amount of a free acid of the at least one acid ranges from 0.1 parts by mass to 100 parts by mass, both inclusive, relative to 100 parts by mass of the conductive polymer.

7. The method for manufacturing an electrolytic capacitor according to claim 1, wherein the solvent contains a polyhydric alcohol.

8. The method for manufacturing an electrolytic capacitor according to claim 1, the method further comprising impregnating the anode body with an electrolyte solution after impregnating the anode body with the dispersion.

9. The method for manufacturing an electrolytic capacitor according to claim 1, wherein the anion is an anion corresponding to at least one acid of a phosphorus-containing oxoacid.

10. The method for manufacturing an electrolytic capacitor according to claim 1, wherein the anion is an anion corresponding to at least one acid selected from the group consisting of a phosphoric acid, a phosphorous acid, a phosphonic acid, a hypophosphorous acid, and a phosphinic acid.

11. A method for manufacturing an electrolytic capacitor, the method comprising:
   preparing a dispersion containing a conductive polymer and a solvent;
   impregnating an anode body having a dielectric layer with the dispersion; and
   impregnating, after impregnating the anode body with the dispersion, the anode body with a treatment solution containing an anion and a cation, wherein:
   the anion is an anion corresponding to at least one acid selected from the group consisting of a phosphorus-containing oxoacid, a sulfuric acid, and a carboxylic acid, and
   the cation is a nitrogen-containing cation.

12. The method for manufacturing an electrolytic capacitor according to claim 11, wherein the treatment solution further contains a polyhydric alcohol.

13. The method for manufacturing an electrolytic capacitor according to claim 11, the method further comprising impregnating the anode body with an electrolyte solution after impregnating the anode body with the treatment solution.

14. The method for manufacturing an electrolytic capacitor according to claim 11, wherein the phosphorus-containing oxoacid includes a phosphoric acid.

15. The method for manufacturing an electrolytic capacitor according to claim 11, wherein the nitrogen-containing cation is a cation derived from at least one nitrogen-containing base selected from the group consisting of ammonia and an amine.

16. The method for manufacturing an electrolytic capacitor according to claim 11, wherein the anion and the cation form a salt.

17. The method for manufacturing an electrolytic capacitor according to claim 16, wherein the salt is at least one selected from the group consisting of ammonium phosphate, diammonium hydrogen phosphate, and ammonium dihydrogen phosphate.

18. The method for manufacturing an electrolytic capacitor according to claim 11, wherein an amount of the anion in terms of an amount of a free acid of the at least one acid ranges from 0.1 parts by mass to 100 parts by mass, both inclusive, relative to 100 parts by mass of the conductive polymer.

19. The method for manufacturing an electrolytic capacitor according to claim 11, wherein the anion is an anion corresponding to at least one acid of a phosphorus-containing oxoacid.

20. The method for manufacturing an electrolytic capacitor according to claim 11, wherein the anion is an anion corresponding to at least one acid selected from the group consisting of a phosphoric acid, a phosphorous acid, a phosphonic acid, a hypophosphorous acid, and a phosphinic acid.

* * * * *